United States Patent
Noda

(10) Patent No.: US 9,712,254 B2
(45) Date of Patent: Jul. 18, 2017

(54) CURRENT-VOLTAGE CONVERSION CIRCUIT, OPTICAL RECEIVER, AND OPTICAL TERMINATOR

(71) Applicant: Mitsubishi Electric Corporation, Chiyoda-ku (JP)

(72) Inventor: Masaki Noda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 17 days.

(21) Appl. No.: 14/909,412

(22) PCT Filed: Aug. 7, 2013

(86) PCT No.: PCT/JP2013/071394
§ 371 (c)(1),
(2) Date: Feb. 1, 2016

(87) PCT Pub. No.: WO2015/019450
PCT Pub. Date: Feb. 12, 2015

(65) Prior Publication Data
US 2016/0173205 A1 Jun. 16, 2016

(51) Int. Cl.
*H04B 10/69* (2013.01)
*H04B 10/272* (2013.01)
*H02M 11/00* (2006.01)

(52) U.S. Cl.
CPC ........ *H04B 10/6931* (2013.01); *H02M 11/00* (2013.01); *H04B 10/272* (2013.01)

(58) Field of Classification Search
CPC .................................................. H04B 10/6931
See application file for complete search history.

(56) References Cited

U.S. PATENT DOCUMENTS 6,911,644 B2 * 6/2005 Doh ..................... H03G 3/3084
250/214 AG
9,094,134 B2 * 7/2015 Noda ................... H04B 10/693
(Continued)

FOREIGN PATENT DOCUMENTS

| EP | 1 032 145 A2 | 8/2000 |
|---|---|---|
| JP | 5-75544 A | 3/1993 |

(Continued)

OTHER PUBLICATIONS

International Search Report Issued Sep. 3, 2013 in PCT/JP13/071394 Filed Aug. 7, 2013.

*Primary Examiner* — Shi K Li
(74) *Attorney, Agent, or Firm* — Oblon, McClelland, Maier & Neustadt, L.L.P.

(57) ABSTRACT

A trans-impedance amplifier that converts a current signal output by a light-receiving element into a voltage signal has a conversion gain that is variable. A gain control circuit detects a bottom voltage with respect to the voltage signal output by the trans-impedance amplifier and controls the conversion gain of the trans-impedance amplifier based on the detection results. A convergence determination circuit determines whether the control of gain is in a convergent state or a non-convergent and outputs to the gain control circuit a determination signal indicating the determination results. When the determination signal indicates a transition from the non-convergent state to the convergent state, the convergence control circuit maintains a value of the conversion gain at a time of the transition.

9 Claims, 4 Drawing Sheets

(56) References Cited

U.S. PATENT DOCUMENTS

| | | | |
|---|---|---|---|
| 2008/0309407 A1 | 12/2008 | Nakamura et al. | |
| 2010/0014866 A1* | 1/2010 | Kang .................. | H03G 3/3084 |
| | | | 398/99 |
| 2010/0067924 A1 | 3/2010 | Noda et al. | |

FOREIGN PATENT DOCUMENTS

| | | |
|---|---|---|
| JP | 11-177360 A | 7/1999 |
| JP | 11-261482 A | 9/1999 |
| JP | 2000-252774 A | 9/2000 |
| JP | 2000-252775 A | 9/2000 |
| JP | 2006-311033 A | 11/2006 |
| JP | 2010-81493 A | 4/2010 |
| JP | 2010-161623 A | 7/2010 |
| WO | 2008/075430 A1 | 6/2008 |

* cited by examiner

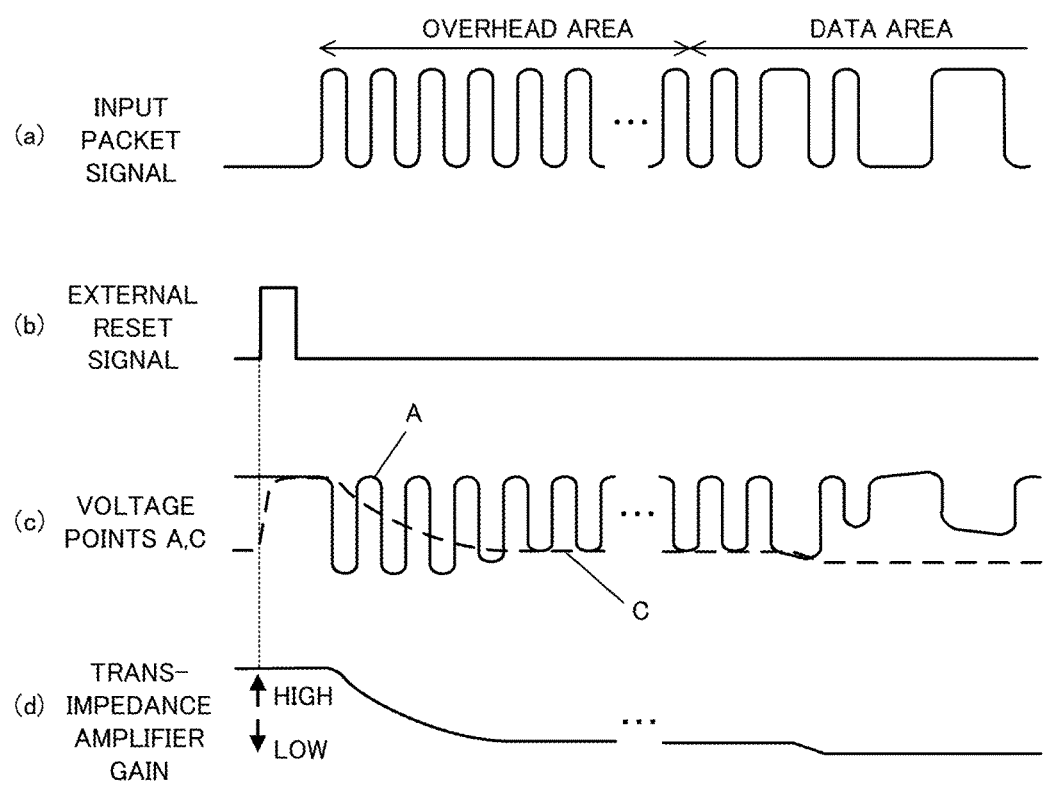

CURRENT-VOLTAGE CONVERSION CIRCUIT, OPTICAL RECEIVER, AND OPTICAL TERMINATOR

TECHNICAL FIELD

The present disclosure relates to a current-to-voltage conversion circuit that converts a burst current signal into a voltage signal, an optical receiver that receives burst optical signals, and an optical line terminal.

BACKGROUND ART

In recent years, a point-to-multipoint access optical communication system referred to as a passive optical network (PON) system constructed with a public network that employs an optical fiber has been widely used in access networks for providing multimedia services to individual households.

The PON system is made up of one station-side optical line terminal (OLT) and multiple subscriber-side optical network units (ONUs) that are connected to the OLT via an optical star coupler. The PON system provides several advantages in that: a reduction in the operational costs can be expected since multiple ONUs can share the OLT as well as the majority of the optical fiber which serves as transmission line; outdoor installation is easy since the optical star coupler, which serves as a passive component, does not require a supply of power; and the system is highly reliable. Accordingly, the PON system recently has been actively introduced as an optical communication system for realizing broadband networks.

For example, in a G-PON system having a transmission speed of 2.5 Gbit/s downstream and 1.25 Gbit/s upstream which is standardized compliant with the international standard G.984 series of the ITU-T, a downstream from the OLT to the ONUs employs a broadcast system using an optical wavelength band of 1480 to 1500 nm. Each of the ONUs retrieves only the data of the allotted time slot from the optical signal sent by the OLT. On the other hand, an upstream from each of the ONUs to the OLT uses an optical wavelength band of 1290 to 1330 nm and employs a time-division multiplex communication system for controlling transmission timing such that data sent from the ONUs does not collide with each other. Since the timing of the transmission is not constant and since there are quiescent periods between data sent by each of the ONUs, the signal received by the OLT is a burst optical signal.

Also, in an XG-PON system having a transmission speed of 10 Gbit/s downstream and 2.5 Gbit/s upstream, which is standardized compliant with the international standard G.987 series of the ITU-T, a downstream from the OLT to the ONUs employs a broadcast system using an optical wavelength band of 1575 to 1580 nm. Each of the ONUs retrieves only the data of the allotted time slot from the optical signal sent by the OLT. On the other hand, an upstream from each of the ONUs to the OLT uses an optical wavelength band of 1260 to 1280 nm and employs a time-division multiplex communication system for controlling transmission timing such that data from the ONUs do not collide with each other.

In such PON systems, since each of the ONUs are positioned at different distances from the OLT, the light-receiving level in the OLT of the optical signal transmitted by each of the ONUs differs per receiving packet received by the OLT from each of the ONUs. Accordingly, there is a demand for an optical receiver at OLT having a wide dynamic range that provides stable and high-speed regeneration of packets with different light-receiving levels. Therefore, optical receivers for OLT are provided with an automatic gain control (AGC) circuit that causes the conversion gain of a trans-impedance amplifier, which converts photoelectric current into a voltage signal, to quickly change to an appropriate gain in accordance with the light-receiving level.

Since the AGC circuit has a time constant for the conversion gain to converge after start of packet signal receiving, a predetermined time is necessary for the OLT optical receiver to regenerate data stably after start of packet signal receiving. Here, the time required for the conversion gain to converge is limited by the transmission speed of the system. In the case of a G-PON system or an XG-PON system, it is necessary to cause the conversion gain to converge within several tens of ns, and there is a demand for a high-speed AGC function.

Here, each packet signal contains an overhead area and a data area, and the overhead area is a fixed digit string of alternating "zeros" and "ones" whereas the data area is a string of random digits. The AGC function of an OLT optical receiver ideally operates to perform convergence in the overhead area at high speed and maintain a constant gain in the data area.

Various systems have been proposed for AGC circuits that have a high-speed response characteristic, and that stabilize at the appropriate gain in a data area (Patent Literature 1, for example). The AGC circuit described in Patent Literature 1 functions to control the conversion min based on the search results of a peak level detection circuit, and functions to make the response time of the AGC circuit high speed only for the vicinity of the head of a received packet signal.

CITATION LIST

Patent Literature

Patent Literature 1: Unexamined Japanese Patent Application Kokai Publication No. H5-75544

SUMMARY OF INVENTION

Technical Problem

The AGC circuit described in Patent Literature 1 is provided with a time constant circuit made up of a condenser, and the like in a peak level detection circuit so that a transient response completes in the overhead area. It is explained that the AGC circuit accordingly has a high-speed response characteristic in the overhead area and enables operation at a stable gain in the data area after a specified period of time has elapsed. After completion of the packet signal, the detection of a fixed time interruption in the pulse train by this AGC circuit causes the electric charge of the condenser of the time constant circuit of the peak level detection circuit to discharge due to the reset signal and return to a high-speed responsive initial state.

Here, each of the packet signals in a G-PON system or an XG-PON system is a random digit string in a data area that contains a consecutive identical digit pattern. When the min bandwidth of an AGC circuit was not appropriate with respect to a bit rate, the fluctuation of the peak level detection value in the data area within the packet signal could potentially cause the amplification gain of the AGC circuit to fluctuate even midway through the data area which was problematic since stable receiving signal regeneration becomes difficult. In other words, there was a trade-off relation between the time required until the transient response converges and the resistance with respect to the consecutive identical digit pattern in the data area. Thus, the issue of attaining high-speed responsiveness and a gain stabilization in a data area has proved to be a challenge.

The present disclosure has been made in order to solve the above-explained technical issue, and it is an objective of the present disclosure to provide a current-to-voltage conversion circuit and the like that enables high-speed response of conversion gain when packet receiving begins, and also enables stabilization at an appropriate conversion gain in the data area.

Solution to Problem

In order to achieve the above objective the current-to-voltage conversion circuit of the present disclosure includes a trans-impedance amplifier for converting a current signal into a voltage signal, the trans-impedance amplifier having a conversion gain that is variable, a gain control circuit that controls the conversion gain based on a bottom voltage of the voltage signal output by the trans-impedance amplifier, and a convergence determination circuit that determines whether the gain control circuit is in a convergent state or a non-convergent state and outputs to the gain control circuit the determination signal, and when the determination signal indicates the transition from the non-convergent state to the convergent state, the convergence control circuit maintains a value of the conversion gain at the time of the transition.

Advantageous Effects of Invention

The present disclosure accordingly enables high-speed response of conversion gain when packet receiving begins and enables stabilization at an appropriate conversion gain in a data area.

BRIEF DESCRIPTION OF DRAWINGS

FIG. 4 is a diagram illustrating a timing chart of the signal of each part in the case when there is no convergence determination circuit.

DESCRIPTION OF EMBODIMENTS

Embodiments

Hereinafter, the embodiments of the present disclosure are explained in detail with reference to the drawings.

Figure 1:
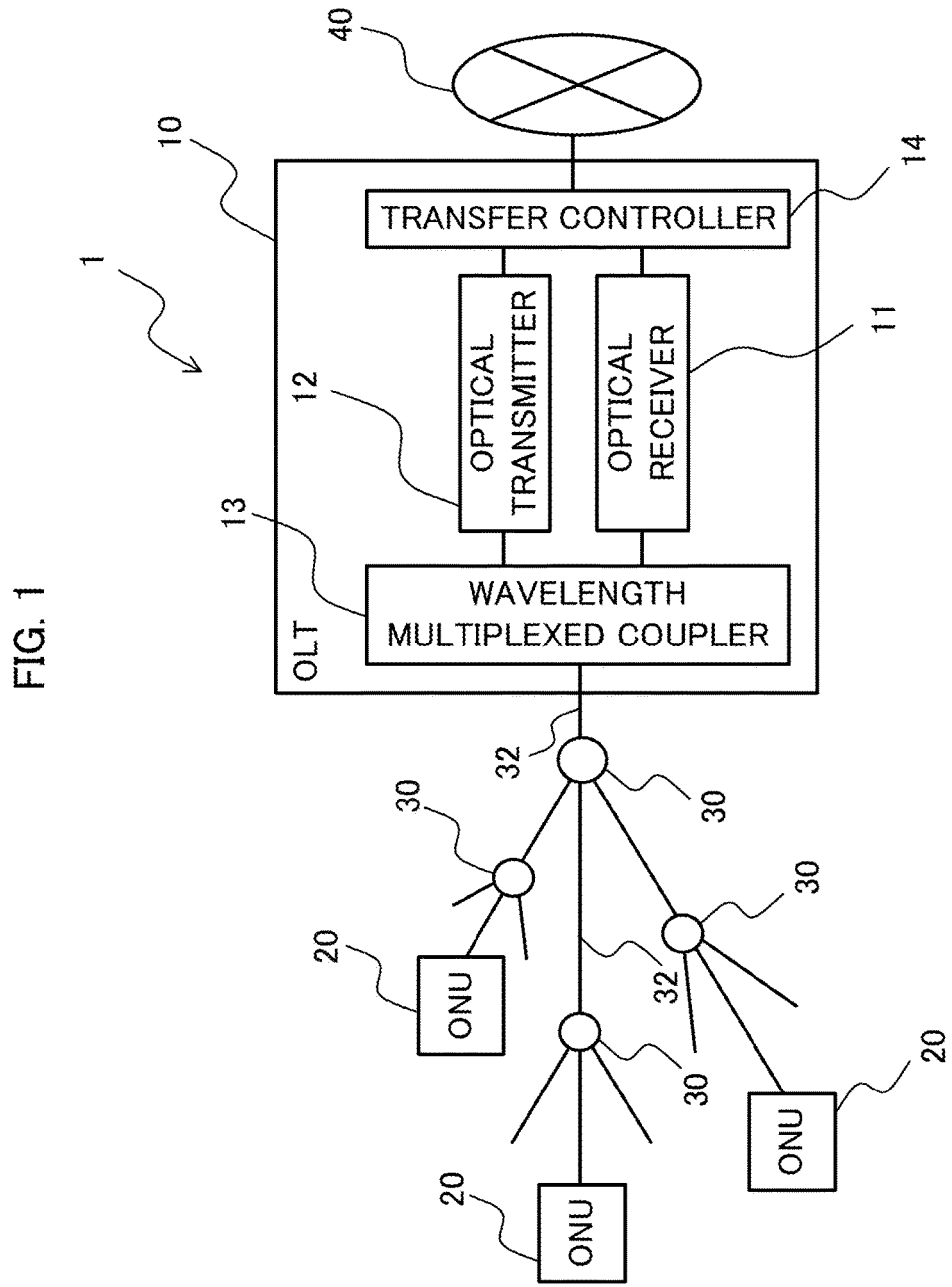
FIG. 1 is a block diagram illustrating an optical communication system configuration set forth in an embodiment.

An optical communication system 1 set forth in the present embodiment is a passive optical network (PON) system that uses point-to-multipoint architecture. The optical communication system 1, as illustrated in FIG. 1, includes one station-side optical line terminal (OLT) 10, multiple subscriber-side optical network units (ONUs) 20, and an optical star coupler 30 that passively splits or combines an optical signal. All of the ONUs 20 are connected to the OLT 10 via at least one optical star coupler 30 and an optical fiber 32.

The OLT 10 is made up of an optical receiver 11, an optical transmitter 12, a wavelength-multiplexed coupler 13, and a transfer controller 14. The wavelength-multiplexed coupler 13 is for outputting a downstream signal and an upstream signal, which have different wavelengths, into a specified direction. The optical signal that is transferred through the optical fiber 32 output from ONUs 20 is output to the optical receiver 11 side and the optical signal output from the optical transmitter 12 is output to the optical fiber 32 side connected to the ONUs 20.

The transfer controller 14 generates a conversion signal based on a baseband signal input from an external network 40 of the Internet and/or the like, which is then input to the optical transmitter 12. The optical transmitter 12 converts the light emitted from the light emitting elements of a semiconductor laser, and/or the like, with a conversion signal input from the transfer controller 14. The converted optical signal is output via the wavelength-multiplexed coupler 13 as a downstream signal, which travels through the optical fiber 32 and is received by each of the ONUs 20.

The optical signal of the upstream signal that travels through the optical fiber 32 sent by the ONUs 20 is input to the optical receiver 11 via the wavelength-multiplexed coupler 13. The optical receiver 11 converts the input optical signal to an electrical signal, demodulates the electrical signal to a receiving signal of the voltage signal and then outputs the demodulated signal to the transfer controller 14. The transfer controller 14 converts the input receiving signal into a baseband signal and outputs to the external network 40.

Here, the optical signal transmitted from each of the ONUs 20 is an intermittent consecutive burst signal. An optical signal generated by multiplexing multiple packet signals in a time division manner is input to the OLT 10. Since each of the ONUs 20 is connected to an OLT 10 via optical fibers 32 of any length and any number of star couplers 30, the strength of the optical signal optically received by the optical receiver 11 of the OLT 10 greatly varies per packet. In other words, the configuration of the optical receiver 11 must be able to handle a wide dynamic range in order to obtain a stable receiving signal from such kinds of optical signals.

Figure 2:
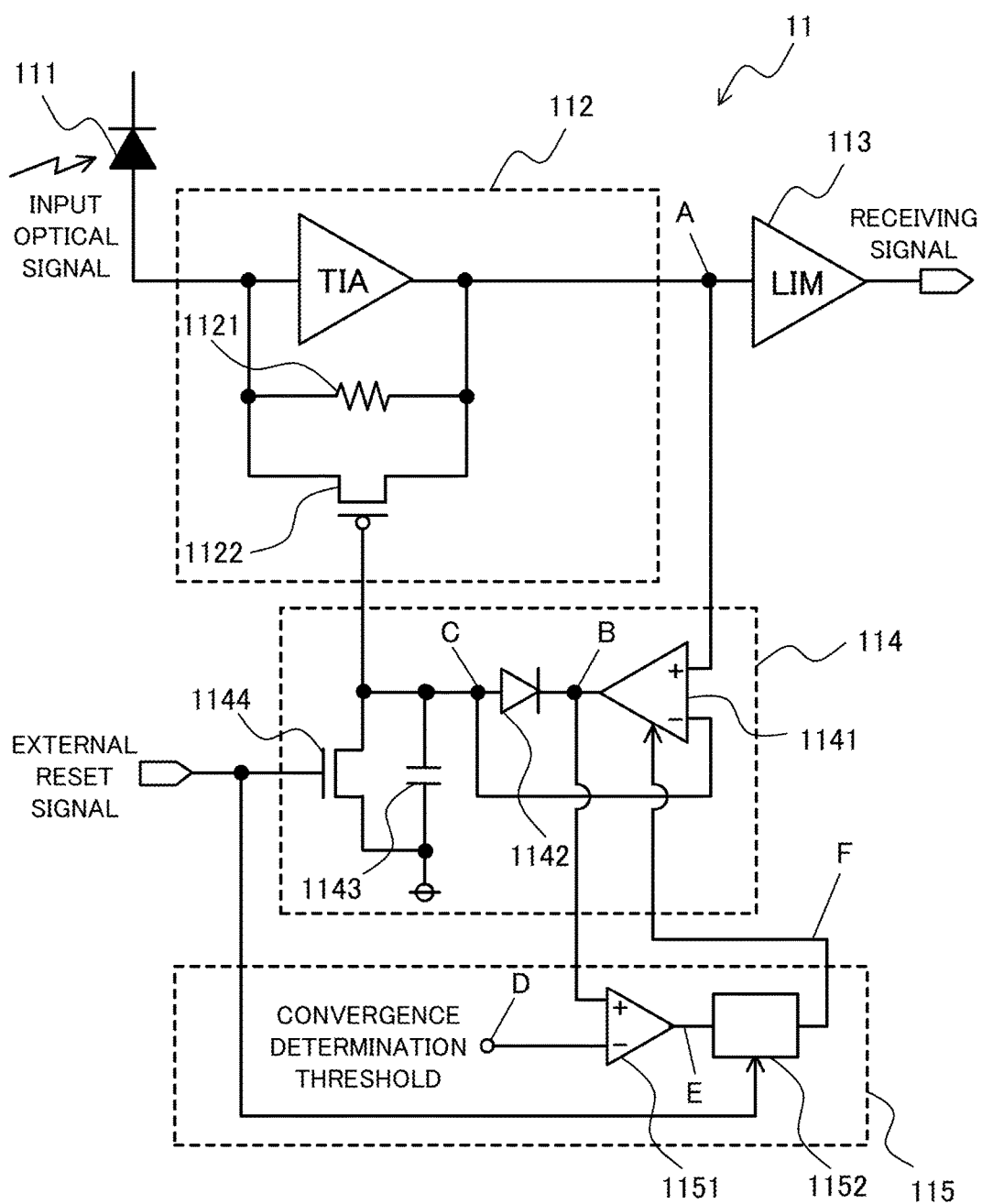
FIG. 2 is a diagram illustrating a circuit configuration of an optical receiver.

The optical receiver 11 of the OLT 10, as illustrated in FIG. 2, includes a light-receiving element 111 that outputs a current signal that corresponds to a received optical signal, a trans-impedance amplifier (TIA) 112 that converts a current signal output by the light-receiving element 111 into a voltage signal, a limiting amplifier (LIM) 113 that outputs a receiving signal amplified to approximately the same amplitude as the voltage signal output by the trans-impedance amplifier 112. Also, the optical receiver 11 further includes a gain control circuit 114 that detects the bottom voltage of the voltage signal output by the trans-impedance amplifier 112 and controls the min of the trans-impedance amplifier 112 based on the detected bottom voltage, and a convergence determination circuit 115 that determines the state of convergence of the gain control signal output by the gain control circuit 114.

The trans-impedance amplifier 112 is equipped with a fixed resistor 1121 and a variable resistor element 1122, and the current-to-voltage conversion gain of trans-impedance amplifier 112 is determined by these resistance values. The variable resistor element 1122 is formed of a field-effect transistor (FET) and the like, for example, and is a circuit element that enables the control of a resistance value by an input voltage. The gain control signal generated by the gain control circuit 114 based on the bottom voltage of the voltage signal is input to the variable resistor element 1122. This enables the trans-impedance amplifier 112 to output the voltage signal that is current-to-voltage-converted by the conversion gain controlled based on the bottom voltage.

The gain control circuit 114 has a configuration in which a cathode-side terminal of a diode 1142 is connected to an output portion of an operational amplifier 1141 and an anode-side terminal of the diode 1142 is connected to an inverting input portion of the operational amplifier 1141. A capacitor 1143 which is charged from the anode terminal voltage is also connected with the anode terminal of the diode 1142. Also, a switch 1144 for discharging the electric charge charged in the capacitor 1143 in response to an external reset signal is provided in parallel with the capacitor 1143. Here, the external reset signal is a pulse signal that is output from any circuit such as the transfer controller 14 that detects the end of the packet signal.

The convergence determination circuit 115 includes a comparator 1151 that compares the output voltage of the operational amplifier 1141 with a predetermined threshold voltage and outputs the comparison result using a high/low voltage, and a logic circuit 1152 that generates a convergence determination signal based on the output signal of the comparator 1151 and the external reset signal.

The convergence determination signal output by the logic circuit 1152 of the convergence determination circuit 115 is input to a shutdown terminal of the operational amplifier 1141. The gain control circuit 114, based on a convergence determination signal, operates so as to follow the input voltage waveform and detect a bottom voltage while in a non-convergent state, and operates so as to stop the following operation while in the convergent state and maintain the bottom voltage detection result at the point in time in which the non-convergent state transitions to the convergent state, irrespective of the input voltage waveform.

Hereinafter, the operation of each part of the optical receiver 11 having the above-described configuration is explained with reference to the timing chart in FIG. 3. The packet signal received by the optical receiver 11 as illustrated in section (a) of FIG. 3 has an overhead area including a fixed digit string of alternating zeros and ones, and has a data area including a random pattern containing a consecutive identical digit pattern.

Figure 3:
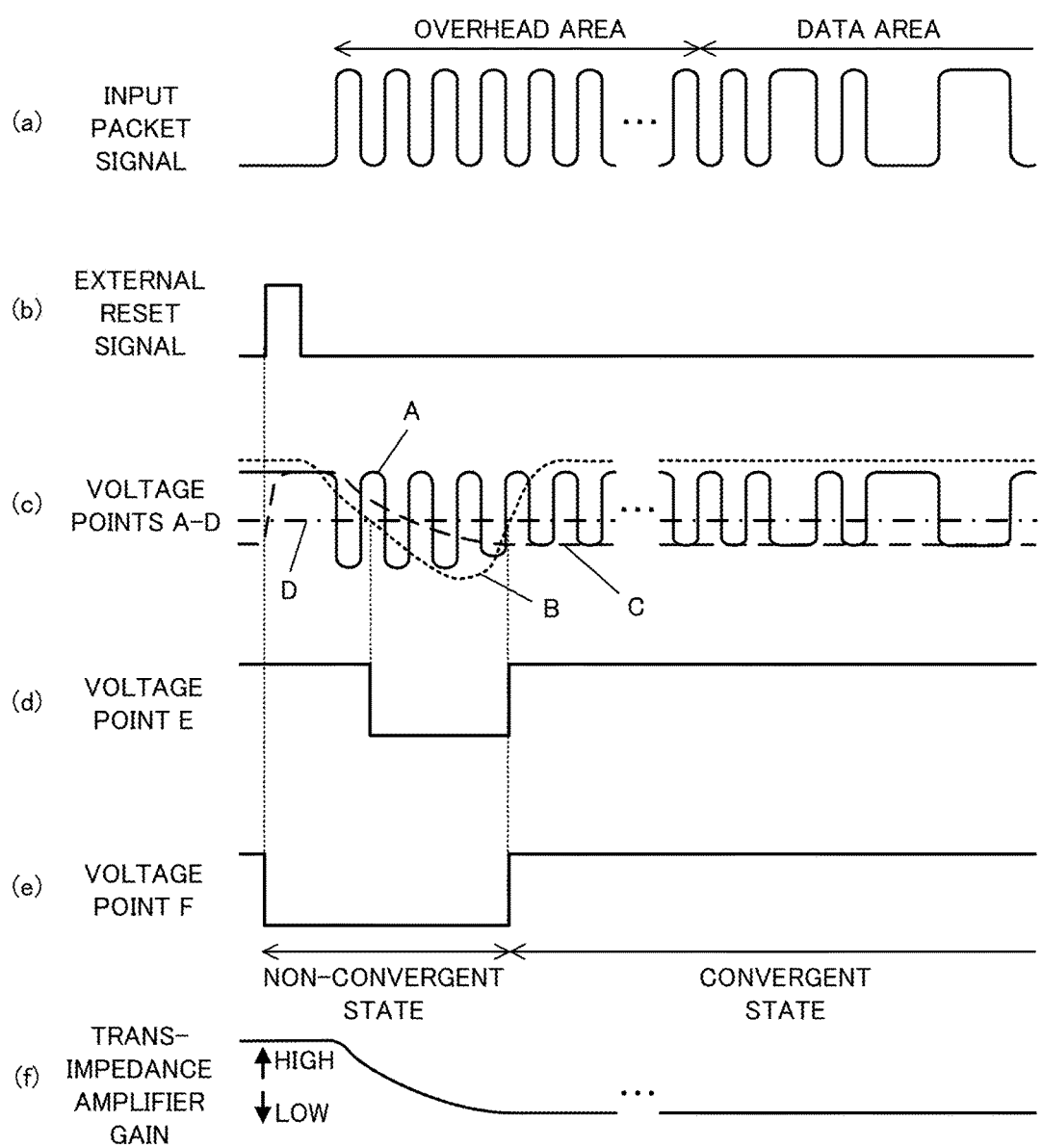
FIG. 3 is a diagram illustrating a timing chart of the signal of each part in the optical receiver set forth in the embodiment.

The packet signals input to the OLT 10 from each of the ONUS 20 are each sent by time-division multiplex so as not to collide with one another but the external reset signal, as illustrated in section (b) of FIG. 3, is inserted in between each of the packet signals. This external reset signal turns the switch 1144 to an ON state thereby discharging the electric charge charged in the capacitor 1143. Accordingly, as illustrated in section (c) of FIG. 3, the output voltage (point C voltage) of the gain control circuit 114 gets initialized and reaches high, and the resistance value of the variable resistor element 1122 reaches maximum. In other words, the current-to-voltage conversion gain of the trans-impedance amplifier 112 is in a state of maximum gain and is ready for the next packet signal to be input.

When the next packet signal is received, as illustrated in section (c) of FIG. 3, the output portion (point A) of the trans-impedance amplifier 112, which is an inverting amplifier, outputs the voltage signal amplified with the maximum min at the beginning of the overhead area. At the same time, the voltage of the output portion (point C) of the gain control circuit 114 begins to drop and the gain control circuit 114 begins tracking operation so that the voltage becomes the same as the bottom voltage of the voltage waveform of point A.

When point C voltage drops, the resistance value of the variable resistor element 1122 drops and since the conversion gain of the trans-impedance amplifier 112 also falls, operation is performed so as to make the amplitude of the voltage waveform of point A to transiently become smaller. When the point C voltage becomes the same as the bottom voltage of point A, without the current flowing to the diode 1142, the capacitor 1143 of the gain control circuit 114 is no longer charged with an electric charge thereby stopping point C voltage from dropping any further.

Also, since the anode-side terminal (point C) of the diode 1142 is connected to an inverting input terminal of operational amplifier 1141, upon receiving the packet signal, the voltage of the output portion (point B) of the operational amplifier 1141 drops like point C. When point C voltage and the bottom voltage value of point A are the same, the point B voltage begins to increase.

The comparator 1151 of the convergence determination circuit 115 outputs high or low voltage depending on whether or not the input voltage (point B) is higher than the threshold voltage (point D). Here, the threshold voltage (point D) of the comparator 1151 is set at a predetermined voltage within the conversion range of point B voltage. As illustrated in section (d) of FIG. 3, the voltage of the output portion (point E) of the comparator 1151 transitions from high to low when point B voltage is dropping and transitions from low to high when point B voltage is increasing.

The logic circuit 1152, as illustrated in section (e) of FIG. 3, generates a gate signal (point F) that transitions from high to low at the external reset signal rising edge and transitions from low to high at the rising edge point E voltage. The gate signal (point F) output by the logic circuit 1152 indicates whether or not the gain control circuit 114 is converging. The signal is low while in the non-convergent state and high while in the convergent state.

The output (point F) of the logic circuit 1152 of the convergence determination circuit 115 is connected to a shutdown circuit portion of the operational amplifier 1141 of the gain control circuit 114. The operational amplifier 1141 operates normally when point F voltage is low (non-convergent state), and shuts down and outputs a constant voltage when point F voltage is high (convergent state). Thus, when point F voltage is low, point C voltage decreases until equal with the bottom voltage of the voltage signal input to the operational amplifier 1141, and when the operational amplifier 1141 shuts down, point F voltage is maintained at a value at the point in time of the transition from low to high.

In other words, the gain control circuit 114 operates so as to follow the input voltage waveform while in the non-convergent state and detect a bottom voltage, and while in the convergent state, operates so as to maintain the bottom voltage detection result at the point in time in which the non-convergent state transitions to the convergent state, irrespective of the input voltage waveform. As for the gain of the trans-impedance amplifier 112, as illustrated in section (f) of FIG. 3, the gain is gradually reduced from the high gain while in a non-convergent state, whereas while in the convergent state, a constant gain is maintained.

Also, after receiving the packet signal, the input of an external reset signal from outside such as the transfer controller 14 before the receiving of the next packet signal causes the switch 1144 to turn to an ON state thereby discharging the electric charge charged in the capacitor 1143. Accordingly, the output voltage of the gain control circuit 114 gets initialized and becomes high thereby making the resistance value of the variable resistor element 1122 become maximum. When the conversion gain of the trans-impedance amplifier 112 is in a state of maximum gain, the next packet signal is ready to be received.

In order to convey the effects of an optical receiver 11 set forth in the present embodiment, the operation is described with reference to the timing chart of FIG. 4 without inclusion of the convergence determination circuit 115.

The movement of point A and C in the overhead area of the optical receiver 11 is the same as movements for the optical receiver 11 (FIG. 3) in the present embodiment. However, for example, when the gain bandwidth of the trans-impedance amplifier 112 is insufficient with respect to a bit rate, the point A and point C move differently as illustrated in the data area in section (c) of FIG. 4.

In the case where there are alternating zeros and ones, the output amplitude of the trans-impedance amplifier 112 that contains many relatively high frequency components becomes smaller. On the other hand, in the cases where identical digits are consecutive in a pattern string, as in for example, "00001111", the output amplitude of the trans-impedance amplifier 112 that contains many relatively low frequency components becomes larger.

In other words, pattern dependence occurs in the output amplitude of the trans-impedance amplifier 112, thus the output amplitude and the minimum bottom voltage of the output waveform of the output portion (point A) of the trans-impedance amplifier 112 are different in the overhead area made up of a fixed digit string of alternating zeros and ones and in the data area made up of a random patterns including consecutive identical digit patterns.

In this case, since the bottom voltage is not maintained based on the determination signal of convergence determination circuit 115 as in the present embodiment, upon completion of the min control operation in the overhead area by the gain control circuit 114, when the bottom voltage detection operation resumes in the data area, there is possibility that the gain of the trans-impedance amplifier 112 will fluctuate as illustrated in section (d) of FIG. 4, thereby making stable receiving signal regeneration difficult.

With respect to this, by equipping the optical receiver 11 set forth in the present embodiment with the convergence determination circuit 115, the gain control circuit 114 operates so as to follow the input voltage waveform and detect a bottom voltage while in a non-convergent state, and while in the convergent state operates so as to maintain the bottom voltage detection result at the point in time in which the non-convergent state transitions to the convergent state, irrespective of the input voltage waveform. As a result, for example, even in a case when the gain bandwidth of the trans-impedance amplifier 112 is insufficient with respect to the bit rate, after the bottom voltage detection operation in an overhead area made up of a fixed digit string of alternating zeros and ones converges, the current-to-voltage conversion gain of the trans-impedance amplifier 112 becomes set at an appropriate value. Accordingly, the optical receiver 11 can stably perform the receiving signal regeneration operation without conversion gain fluctuations even in the data area made up of random patterns.

As described above, according to the present embodiment, the gain control circuit 114 detects a bottom voltage of the voltage signal output by the trans-impedance amplifier 112 that performs current-to-voltage conversion and controls the conversion gain of the trans-impedance amplifier 112 based on detection of the bottom voltage, and the convergence determination circuit 115 determines whether the control of the gain is in a convergent state or a non-convergent state and the gain control circuit 114 maintains a value of the conversion gain at the time of the transition in which the determination signal indicates the transition from the non-convergent state to the convergent state. Therefore, it is possible to achieve both the high-speed response of gain control in the overhead area and consecutive identical digit data tolerance in the data area.

As mentioned, the present disclosure includes a trans-impedance amplifier that converts a current signal into a voltage signal, the trans-impedance amplifier having a conversion gain that is variable, a gain control circuit that detects a bottom voltage of the voltage signal output by the trans-impedance amplifier and controls the conversion gain of the trans-impedance amplifier based on detection of the bottom voltage, and a convergence determination circuit that determines whether the gain control circuit is in a convergent state or a non-convergent state, and when the non-convergent state transitions to the convergent state, the gain control circuit maintains a value of the conversion gain at the time of the transition. Hence, this enables high-speed response of conversion gain when packet receiving begins, and enables stabilization at an appropriate conversion gain in the data area.

The foregoing describes some example embodiments for explanatory purposes. Although the foregoing discussion has presented specific embodiments, persons skilled in the art will recognize that changes may be made in form and detail without departing from the broader spirit and scope of the invention.

For example, in the above-described embodiment, even though the gain control is performed based on the bottom voltage detected by the gain control circuit 114 and the convergent state is determined, a peak voltage detection circuit may be provided and the gain may be controlled based on the detected peak voltage and a convergent state may be determined.

Also, in the above-described embodiment, even though the optical current output from the light-receiving element 111 is converted into the voltage signal, there is no limitation to this and any current-to-voltage conversion circuit can be applied that outputs a voltage signal based on an input burst current signal with a wide dynamic range.

REFERENCE SIGNS LIST

1 Optical communication system
10 OLT
20 ONU
30 Optical star coupler
32 Optical fiber
40 External network
11 Optical receiver
111 Light-receiving element
112 Trans-impedance amplifier
1121 Fixed resistor
1122 Variable resistor element
113 Limiting amplifier
114 Gain control circuit
1141 Operational amplifier
1142 Diode
1143 Capacitor
1144 Switch
115 Convergence determination circuit
1151 Comparator
1152 Logic circuit
12 Optical transmitter
13 Wavelength-multiplexed coupler
14 Transfer controller

The invention claimed is:

1. A current-to-voltage conversion circuit, comprising:
   a trans-impedance amplifier to convert a current signal into a voltage signal, the trans-impedance amplifier having a conversion gain that is variable;
   a gain control circuit to detect a bottom voltage of the voltage signal output by the trans-impedance amplifier, and to control the conversion gain of the trans-impedance amplifier based on detection of the bottom voltage; and
   a convergence determination circuit to determine whether the gain control circuit is in a convergent state or a non-convergent state, and to output to the gain control circuit a determination signal indicating the determined state,
   wherein when the determination signal indicates a transition from the non-convergent state to the convergent state, the gain control circuit is to maintain a value of the conversion gain at a time of the transition.

2. The current-to-voltage conversion circuit according to claim 1, wherein the gain control circuit comprises:
   an operational amplifier to input the voltage signal output by the trans-impedance amplifier;
   a diode wherein a cathode-side terminal is connected to an output terminal of the operational amplifier, and an anode-side terminal is connected to an inverting input terminal of the operational amplifier; and
   a capacitor connected to the anode-side terminal of the diode,
   wherein the conversion gain of the trans-impedance amplifier is to be controlled based on a voltage value of the anode-side terminal of the diode, and
   wherein the convergence determination circuit is to determine whether the gain control circuit is in the convergent state or the non-convergent state based on results from comparing an output voltage of the operational amplifier with a reference voltage.

3. The current-to-voltage conversion circuit according to claim 2, wherein the operational amplifier of the gain control circuit is to operate based on the voltage signal input when the determination signal indicates the non-convergent state, and is to maintain a constant output voltage when the determination signal indicates the convergent state.

4. The current-to-voltage conversion circuit according to claim 3, wherein
   the convergence determination circuit is to cause the determination signal to transition from the convergent state to the non-convergent state based on input of a reset signal, and,
   the operational amplifier of the gain control circuit is to begin operation based on the determination signal that transitioned to the non-convergent state.

5. An optical receiver, comprising:
   an optical element to convert an optical signal into a current signal;
   a trans-impedance amplifier to convert the current signal output from the optical element into a voltage signal, the trans-impedance amplifier having a conversion gain that is variable;
   a limiting amplifier to amplify the voltage signal output by the trans-impedance amplifier, and to output a receiving signal having a predetermined amplitude;
   a gain control circuit to detect a bottom voltage of the voltage signal output by the trans-impedance amplifier, and to control the conversion gain of the trans-impedance amplifier based on detection of the bottom voltage; and
   a convergence determination circuit to determine whether the gain control circuit is in a convergent state or a non-convergent state, and to output to the gain control circuit a determination signal indicating the determined state,
   wherein when the determination signal indicates a transition from the non-convergent state to the convergent state, the gain control circuit is to maintain a value of the conversion gain at a time of the transition.

6. The optical receiver according to claim 5, wherein the gain control circuit comprises:
   an operational amplifier to input the voltage signal output by the trans-impedance amplifier;
   a diode wherein a cathode-side terminal is connected to an output terminal of the operational amplifier, and an anode-side terminal is connected to an inverting input terminal of the operational amplifier; and
   a capacitor connected to the anode-side terminal of the diode,
   wherein the conversion gain of the trans-impedance amplifier is to be controlled based on a voltage value of the anode-side terminal of the diode, and
   wherein the convergence determination circuit is to determine whether the gain control circuit is in the convergent state or the non-convergent state based on results from comparing an output voltage of the operational amplifier with a reference voltage.

7. The optical receiver according to claim 6, wherein the operational amplifier of the gain control circuit is to operate based on the voltage signal input when the determination signal indicates the non-convergent state, and is to maintain a constant output voltage when the determination signal indicates the convergent state.

8. The optical receiver according to claim 7, wherein the convergence determination circuit is to cause the determination signal to transition from the convergent state to the non-convergent state based on input of a reset signal input, and
   the operational amplifier of the gain control circuit is to begin operation based on the determination signal that transitioned to the non-convergent state.

9. An optical line terminal comprising the optical receiver according to claim 5.

* * * * *